Patented May 21, 1929.

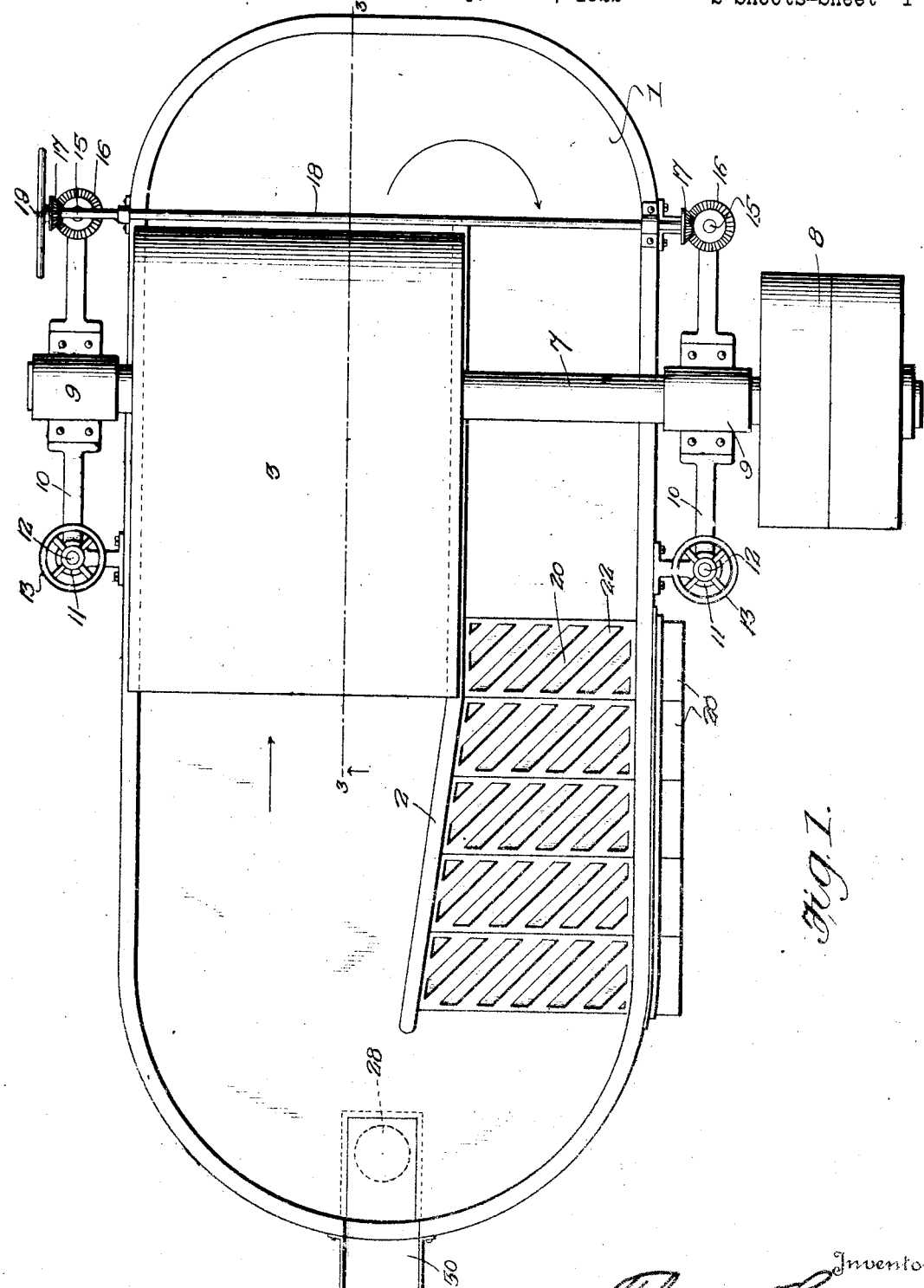

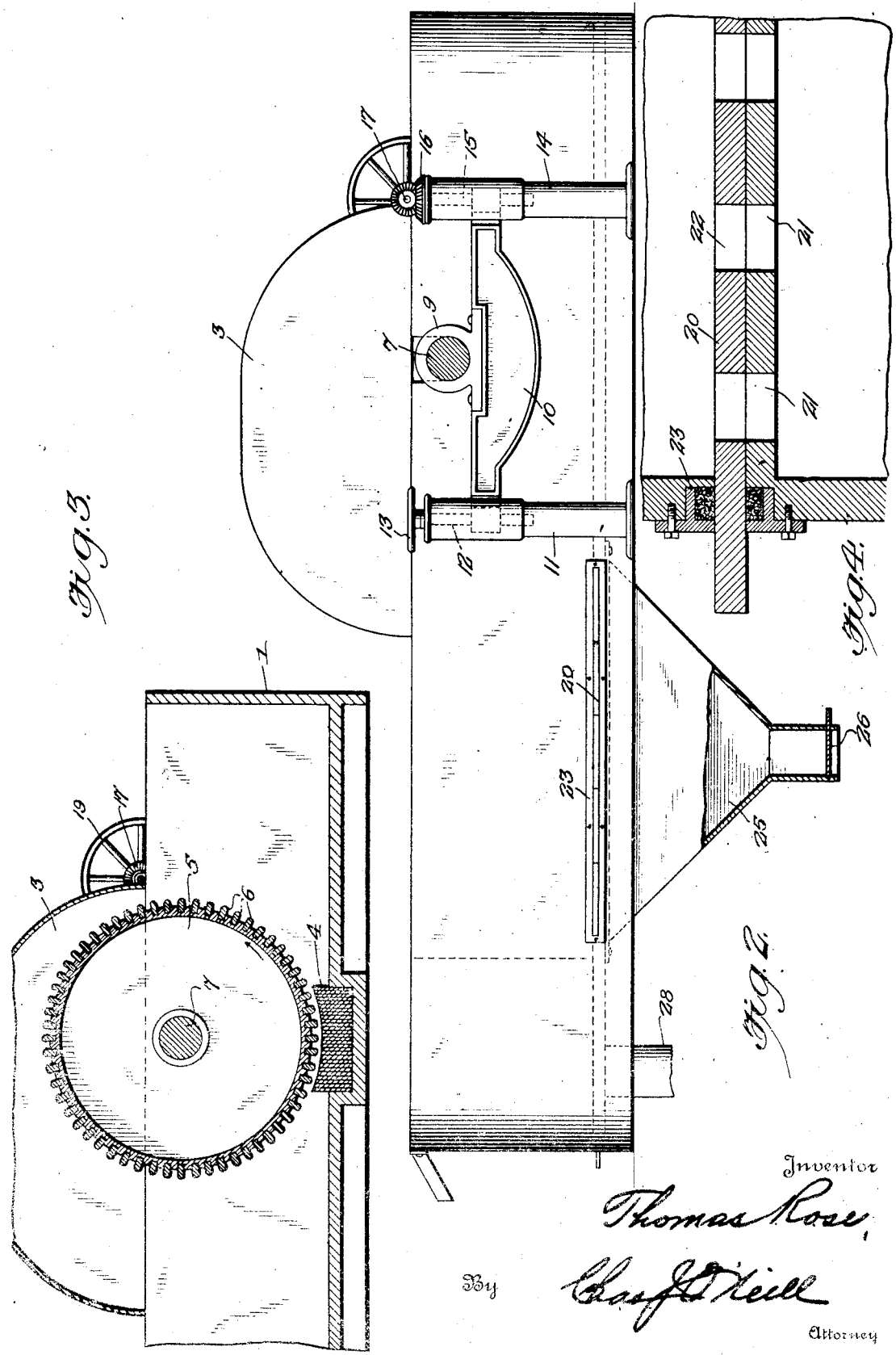

1,714,438

UNITED STATES PATENT OFFICE.

THOMAS ROSE, OF AMBLER, PENNSYLVANIA; ELIZABETH M. ROSE, NOW BY MARRIAGE ELIZABETH MacILHENNY EVANS, EXECUTRIX OF SAID THOMAS ROSE, DECEASED, ASSIGNOR TO SELECTIVE TREATMENT COMPANY LIMITED, OF MONTREAL, CANADA, A CORPORATION OF QUEBEC, CANADA, AND POWHATAN MINING CORPORATION, OF BALTIMORE, MARYLAND, A CORPORATION OF MARYLAND.

METHOD FOR SEPARATING ASBESTOS.

Application filed April 22, 1922. Serial No. 555,960.

The invention relates to a method for separating asbestos from rock and associated impurities occurring in the natural mineral, and simultaneously separating the fibrous elements of the asbestos from each other without damaging or impairing the fibres, so that the latter are obtained in the best possible condition as to length and purity for spinning and other commercial operations to which the fibre is particularly adapted.

In all the commercial forms of separating asbestos from associated material occurring in the natural minerals, the so-called asbestos rock has been crushed in a dry state, usually in edge-runners or similar mills, with the result that a very large proportion of the valuable asbestos fibre is badly mutilated and comminuted, so that it is no longer available for applications requiring long fibre, and a very large proportion of the comminuted fibre is lost, either passing off as dust or being carried away with the gangue. Much of the natural mineral occurs associated with clay, rock, earthy impurities and other mineral constituents, such, for example, as iron, all of which would exercise a grinding action on the fibres of asbestos when it is attempted to comminute the mineral in a dry state. It has been proposed to overcome these objections by crushing the asbestos rock in a stamp mill submerged in water to pulverize the rock and crush the asbestos, to cause the disintegration of the latter into separate fibres, and to float off the fibres while the gangue and heavier impurities subside. This proposed mode of treatment, however, proved ineffective and has never gone into commercial use, because of the obvious mechanical difficulties of operating such a mill and the practical impossibility of effecting anything like a satisfactory separation of the fibres without disrupting the same. The present invention, however, has been demonstrated to be entirely effective, not only in separating the fibres from the other constituents of the mineral without materially impairing the fibres, but also delivering the latter as a long, staple product free from impurities, and therefore ready for immediate use in the various industries in which long fibres are essential.

To effect these highly desirable objects, the invention involves a method and apparatus whereby the asbestos rock, as the same comes from the mine, is submerged in water in a suitable tank or vat, so that the fibre is wetted and thereby toughened and rendered more flexible, and the submerged rock subjected to roller crushing, the batch of mineral being passed successively through the crushing apparatus by means of a continuous circulation of the water of submergence, the roller crushing operation effectively breaking up the harder elements of the mineral, but causing the wetted asbestos fibres to slip apart and separate.

The flow of the water in the tank will be effective in causing any of the lighter impurities to rise and be discharged from a suitable overflow outlet at one end of the tank, while the heavier comminuted elements of the rock or mineral constituents will be forced along the bottom of the tank and collected in a suitable riffle-like apparatus from which they are discharged into a subjacent hopper, while the separate asbestos fibres will be continued in circulation until all of the foreign elements are separated therefrom, either by flotation or subsidence, after which the fibres may be discharged by suitable bottom outlet from the tank.

In the accompanying drawings,—

Fig. 1 is a plan view of a simple and preferred form of apparatus for carrying out the invention;

Fig. 2 is a side elevation thereof;

Fig. 3 is a longitudinal section on line 3—3 of Fig. 1;

Fig. 4 is an enlarged sectional detail view of the device for collecting and discharging the heavier impurities of the crushed rock.

Referring to the drawings, 1 indicates a tank or vat, preferably provided with rounded ends, and having a vertical partition 2 extending longitudinally of the tank and terminating short of the ends thereof, so that, when a body of water is set in motion in the tank, it will effect a continuous circulation around the tank and about the partition 2.

Extending across the bottom of the tank from the partition 2 to the opposite side, is a bed plate 4 consisting of wear-resisting metal bars separated by suitable spacers of less height than the bars, and co-operating with the transverse bars is a crushing roll or drum 5 having its periphery provided with longitudinal bars 6, which co-operate with the bars 4 of the bed plate to crush and comminute material passed between the drum and the bed plate. The crushing drum or roller 5 is mounted on a shaft 7, which is journalled transversely of the tank 1, and is capable of vertical adjustment to regulate the pass between the tooth-like bars 6 on the drum and the transverse bars of the bed plate 4.

To effect the vertical adjustment of the drum, the shaft 7 is mounted in journal bearings or pillow-blocks 9 carried by yokes 10, which latter are supported at their respective ends by adjusting screws 12 and 15, mounted in pillars 11 and 14 secured to the sides of the tank. The adjusting screws 15 are preferably simultaneously operated by means of bevel gears 17 on cross shaft 18 engaging bevel pinions 16 connected with the respective screws 15, said shaft 18 being provided with a suitable hand-wheel 19. Individual screws 12 are operated by separate hand-wheels 13. This provides a comparatively wide range of adjustment of the crushing roller drum 5 with respect of the bed plate, to regulate the degree of comminution of the rock and also to compensate for wear between the co-operating parts of the apparatus.

The upper portion of the drum is enclosed in suitable housing 3, which extends from the top of the partition 2 to the opposite side of the tank.

Located in the body of the tank and on the opposite side of the partition 2 to the crushing rollar drum 5 is a riffle-like device formed by a series of parallel slots or openings 21 in the bottom of the tank above which are slidably mounted several plates 20 having similarly arranged openings or slots 22 therein, the ends of the plates passing through the side wall of the tank and being suitably packed, as by a gland 23, to prevent leakage. The plates 20 are so proportioned and arranged that when they are in their normal adjustment, as indicated in Fig. 1, the slots 22 in each of the plates will overlie the slat-like portions of the bottom of the tank between the slots 21 in the latter, so that the slots 22 will constitute a series of pockets or riffles for collecting the heavier sedimentary elements of the crushed rock.

By moving the plates outward so that the slots 22 therein come into registry with the slots 21 in the bottom of the tank, any material tending to settle towards the bottom of the tank will be discharged through the registering slots in the plates in the tank bottom and be received in a subjacent hopper 25, from which the collected material may be ultimately discharged by a suitable gate or valve 26.

The end of the tank beyond the riffles is provided with an overflow spout or trough 30 at its upper edge, from which the lighter elements of the crushed rock, which float in the water current, are discharged, and a bottom outlet 28 controlled by a suitable gate, valve or plug, from which the separated and cleaned asbestos fibre is discharged, after all of the other elements of the mineral have been eliminated.

In carrying out the method, in the particular form of apparatus illustrated, the tank is supplied with water and a charge of the asbestos rock is dumped into the head end of the tank in advance of the crushing drum or roller 5, and the latter rotated, in the direction of the arrow in Fig. 3, from the belt pulley 8. The rotation of the drum causes the bars thereon to set up a strong current of water, which circulates around the tank with sufficient force to carry the broken rock into engagement with the drum, and the heavy metal bars 6 on the latter serve to break up the larger sections of the rock, and eventually all of the rock is carried between the surface of the revolving drum and the bed plate 4, where the frangible elements of the mineral are comminuted and the fibres of the asbestos are parted or separated by the rubbing action effected by the bars on the drum forcing the coherent masses of fibre against and transversely of the rounded surface of the bed plate, without, however, breaking or impairing the fibres to any appreciable extent. Preferably the lateral edges of the bar 6 are rounded, so as to avoid sharp corners or angles which would tend to cut or otherwise impair the fibres of the asbestos as the material is passed successively between the drum and the bed plate. The entire batch of the mineral is carried repeatedly, by the circulating current of the water of submergence, through the crushing or comminuting apparatus represented by the drum or roller and the co-operating bed plate, until all of the friable elements have been sufficiently comminuted, and the asbestos entirely separated from the other constituents of the ore, and the asbestos fibres separated from each other. As the heavier elements of the ore are separated and swept around by the current, they settle in the riffles formed by the slotted plates 20, co-operating with the bottom of the tank, while the lighter elements of the ore, capable of flotation, rise to the surface of the water and pass out with the surplus water by way of the discharge spout 30, sufficient water being continuously supplied to effect this result. When the slots in the riffle-plates 20 are filled with the sedimentary elements of the ore, the plates are moved outwardly to bring the slots 22 in the plates into registry with the slots 21 in the bottom of the tank to discharge the sediment into the hopper 25. Under certain conditions, it may be advantageous to operate the apparatus with the slots 21 and 22 aforesaid either wholly or partially in registry, so that the heavier crushed elements of the ore may settle at once into the hopper as they are carried over the riffle-plates by the current. The asbestos fibres, being lighter than the crushed and granular elements of the ore, are swept around in continuous circuit by the current and are not arrested by the riffle plates. After all the foreign material has been thus eliminated from the crushed ore or rock, the lighter elements passing off by way of the spout 30, and the heavier sedimentary matter passing into the hopper 25, the plates 20 above the latter are moved to close slots 21 in the bottom of the tank, and the drum is brought to rest, the gate or valve closing the outlet 28 in the bottom of the tank is then opened, and the thoroughly cleaned, long fibres of the asbestos are carried out by the water and delivered into suitable receptacles, from which they are taken to squeezing rollers and suitable drying apparatus.

If the asbestos fibres are contaminated with adherent iron or other metalliferous values which would impair the finished asbestos product, these metal constituents may be eliminated by adding a suitable solvent for the particular metals prior to the final washing. It will also be understood that any admixed clay, earth or water soluble material will be quickly softened and separated from the fibres and carried off by the overflow. As indicated, the crushing roller or drum may be adjusted with respect to the bed plate, so as to effectively crush all of the elements of the rock except the fibres without damaging the latter, the relative movement of the drum and bed plate producing a physical separation of the individual fibres as the asbestos mass, associated with the gangue and other constituents of the rock, passes through the crusher.

After all of the objectionable elements have been removed, the asbestos is left in the shape of long, staple fibres thoroughly cleaned, and in proper condition, after drying, for the usual applications of such long fibres, and when properly operated, the process results in a minimum of broken fibres, so that there is very little wastage of the asbestos constituent.

What I claim is:

1. The method of separating asbestos fibre from rock and associated impurities which comprises submerging the mineral in water, passing the mineral repeatedly through rubbing and crushing means by a continuous re-circulation of the water of submergence to break up the friable elements and separate the integral fibres, and separating the lighter constituents by flotation and the heavier constituents by sedimentation.

2. The method of separating asbestos fibre from rock and associated impurities which comprises repeatedly subjecting a given mass of mineral to a pressing force to comminute the friable elements and effect a physical separation of the integral fibres by a continuous re-circulation of water, whereby the lighter constituents will be carried off by the water overflow, the heavier constituents will be dissociated by sedimentation and the asbestos left as long, staple fibres.

In testimony whereof I affix my signature.

THOMAS ROSE.